(No Model.)
G. & A. RAYMOND.
GRINDING DISK FOR MILLS.
No. 348,637. Patented Sept. 7, 1886.
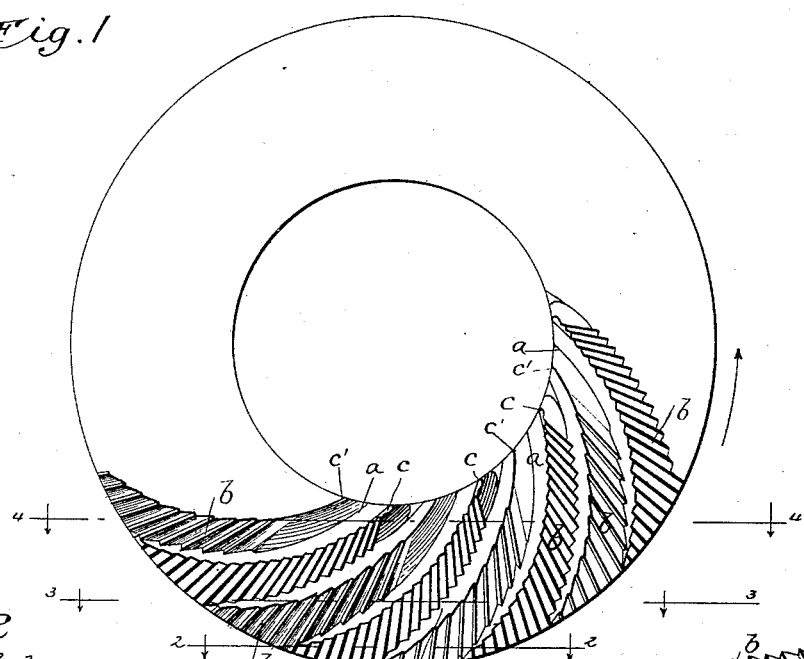
Fig. 1
Fig. 2
on line 2-2
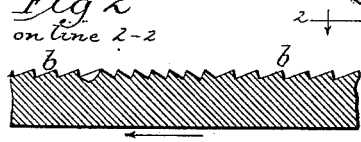
Fig. 3
on line 3-3
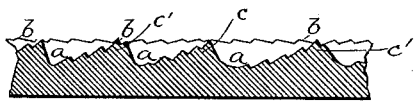
Fig. 4
on line 4-4
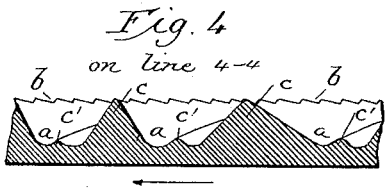
Fig. 5.
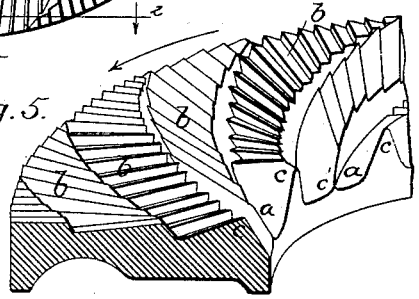
Fig. 6.
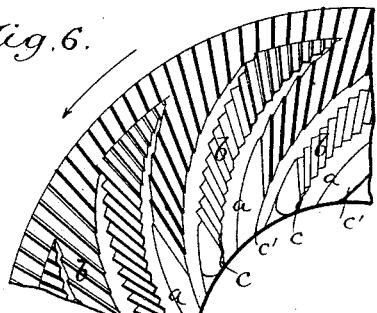
WITNESSES
Sidney P. Hollingsworth
W. L. Kennedy
INVENTOR
George Raymond
Albert Raymond
By P. T. Dodge
Attorney
N. PETERS, Photo-Lithographer, Washington, D.C.

UNITED STATES PATENT OFFICE.

GEORGE RAYMOND AND ALBERT RAYMOND, OF CHICAGO, ILLINOIS.

GRINDING-DISK FOR MILLS.

SPECIFICATION forming part of Letters Patent No. 348,637, dated September 7, 1886.

Application filed August 3, 1885. Renewed July 24, 1886. Serial No. 209,031. (No model.)

*To all whom it may concern:*

Be it known that we, GEORGE RAYMOND and ALBERT RAYMOND, of Chicago, in the county of Cook and State of Illinois, have invented certain Improvements in Grinding-Disks for Mills, of which the following is a specification.

Our invention relates to that class of grinding-disks which are commonly cast complete in one piece, although they may be made in sections bolted to a supporting-plate; and the invention consists in the peculiar form and arrangement of furrows and teeth, as hereinafter described in detail, whereby the feeding of the material between the disks is insured, and a rapid and uniform reduction effected.

In the accompanying drawings, Figure 1 represents a face view of our disk in its usual form. Figs. 2, 3, and 4 are cross-sections of the same, looking in the directions indicated by the arrows. Fig. 5 is a perspective view of a portion of the disk. Fig. 6 is a view showing the disk with an additional series of peripheral grinding-teeth, which may be omitted when desired.

Referring to Figs 1 and 5, it will be seen that the face of the disk contains a series of wide and deep feeding-furrows, $a$, commencing at the eye and curving outward and backward to the periphery, and that each of these furrows has its surface crossed by numerous fine grinding-teeth, $b$. The feeding-furrows, which are of diminishing depth from their inner to their outer ends, vanish at or near the periphery, so that the peripheral face of the disk is flat or unbroken, except by the fine grinding-teeth. In consequence of this construction the feeding-furrows lift or force the grain in its passage through them outward toward the opposing disk, and insure the reduction of the grain to the proper standard before it is permitted to escape at the periphery. In cross-section each of the feeding-furrows $a$ is deeper at the front than at the rear side, its bottom surface, on which the small grinding-teeth are formed, rising at the rear edge to the plane of the periphery, as plainly represented in Figs. 3, 4, and 5. Every alternate rib $c$, between the feeding-furrows is extended inward in full height—that is to say, level with the periphery—to the eye of the disk, while the intermediate ribs, $c'$, are cut down at the inner ends, thus enlarging the feeding-furrows and facilitating the passage of the material from the eye between the grinding-surfaces.

It is to be noted as an important feature of the disk that the grinding-teeth extend entirely across the feed-furrows and have their rear ends exposed at the tops or crests of the ribs, so that as the disk wears down the teeth will continue to expose ends and edges of the original form. The grinding-teeth may have either inclined or abrupt faces on the forward side, so as to operate with a cutting or a crushing action on the grain, as circumstances may require; but we commonly construct those of one rib with inclined crushing-faces at the front and those of the next rib with upright cutting-faces at the front. The grinding-teeth extend in lines substantially radial, but they may be given any desired degree of draft, either forward or backward of the radial line, as it is desired to have the disk grind with greater or less rapidity. If the teeth be inclined forward of the radial line toward their outer ends they will tend to retard the grain and retain the same between the disks for a greater length of time. If, on the contrary, they be given a backward draft, they will urge the grain speedily toward the periphery in a manner well understood by those familiar with the art of milling.

In making use of the disks they are arranged in pairs face to face, and one or both revolved in the direction indicated by the arrows. The grain entering the ends of the feeding-furrows is urged rapidly outward, and encountering the grinding-teeth on the bottoms of the furrows is rapidly reduced thereby, the teeth of each disk serving to force the grain over the crests or edges of the ribs on the opposite disk in such manner that the elevated ends of the teeth, passing in close proximity to each other, effect the reduction with great rapidity. Owing to the fact that the feed-furrows vanish at the periphery the grain cannot escape until it has been subjected to the reducing action of the grinding-teeth.

The disks constructed as above are complete, operative, and sufficient for most purposes. When, however, it is required to give the grain a further or additional reduction, the disks may be provided, as shown in Fig. 6, with an additional series of peripheral teeth. These teeth are arranged in a circular series, and have straight or substantially straight cutting-edges extended in a proximately radial line. Their forward faces are inclined backward, in order to act with a crushing effect upon the material subsequent to the action of the internal or central cutting-teeth.

Having thus described my invention, what I claim is—

1. The grinding-disk constructed with the feeding-furrows $a$, which vanish at or near the periphery, and with the transverse grinding-teeth $b$, and the ribs $c'$, the latter between the alternate furrows being reduced below the general surface at their inner ends, as described.

2. The grinding-disk having the feed-furrows $a$ deepest at the forward side, and the substantially radial grinding-teeth crossing said furrows from the base to the crest, whereby the rear ends of said teeth are exposed to act on the material passing over them.

3. The grinding-disk provided with the vanishing feed-furrows having transverse teeth therein, and with the intermediate ribs, $c$, provided with transverse grinding-teeth, the ribs having their crests level or substantially level with the periphery of the disk from their inner to their outer ends.

4. The grinding-disk provided with the vanishing feed-furrows and the transverse grinding-teeth therein, and also with the peripheral series of teeth having inclined faces on the forward side, whereby the material is first subjected to a cutting and subsequently to a crushing action.

5. The grinding-disk provided with the feed-furrows vanishing at the periphery, the furrows being alternately provided with cutting and with crushing teeth extending transversely thereof.

In testimony whereof we hereunto set our hands in the presence of two attesting witnesses.

GEORGE RAYMOND.
ALBERT RAYMOND.

Witnesses:
FREDERICK C. GOODWIN,
E. L. HUBER.